United States Patent [19]

Lee et al.

[11] 4,026,842

[45] May 31, 1977

[54] METHOD OF PREPARING FIRE RETARDANT OPEN-CELL SILOXANE FOAMS AND FOAMS PREPARED THEREFROM

[75] Inventors: Chi-Long Lee; Gary M. Ronk, both of Midland, Mich.

[73] Assignee: Dow Corning Corporation, Midland, Mich.

[22] Filed: July 14, 1975

[21] Appl. No.: 595,915

[52] U.S. Cl. .................... 260/2.5 S; 260/2.5 D; 260/2.5 FP; 260/46.5 UA; 260/46.5 H; 260/46.5 G; 260/825; 260/37 SB

[51] Int. Cl.$^2$ .................................. C08J 9/02

[58] Field of Search ............ 260/46.5 UA, 46.5 H, 260/46.5 G, 2.5 S, 825

[56] References Cited

UNITED STATES PATENTS

| | | | |
|---|---|---|---|
| 3,425,967 | 2/1969 | Modic | 260/2.5 S |
| 3,677,981 | 7/1972 | Wada et al. | 260/2.5 S |
| 3,923,705 | 12/1975 | Smith | 260/2.5 S |

Primary Examiner—Morton Foelak
Attorney, Agent, or Firm—Roger H. Borrousch

[57] ABSTRACT

Siloxane foams can be prepared by mixing an organohydrogensiloxane, a hydroxylated organosiloxane and a platinum catalyst in amounts such that the ratio of silicon-bonded hydrogen atoms to silicon-bonded hydroxyl radicals is from 2.5 to 7 and thereafter allowing the mixture to foam. The amount of open-cell structure in the foam can be increased by having present in the mixture an organomonohydrogensiloxane such that the molar ratio of silicon-bonded hydrogen atoms from the organohydrogensiloxane to silicon-bonded hydrogen atoms from the organomonohydrogensiloxane is from 0.4 to 2. The siloxane foams can be made to have an increased fire retardant property by adding 0.01 to 2 parts by weight carbon black based on the weight of the total composition. Siloxane foams are also prepared from mixing an organohydrogensiloxane, an organomonohydrogensiloxane, a hydroxylated organosiloxane, a vinyl containing triorganosiloxy endblocked polydiorganosiloxane and a platinum catalyst. These foams can be used for cushioning, in acoustical applications and protective filling or coating applications and especially applications wherein fire retarding is important.

35 Claims, No Drawings

METHOD OF PREPARING FIRE RETARDANT OPEN-CELL SILOXANE FOAMS AND FOAMS PREPARED THEREFROM

BACKGROUND OF THE INVENTION

1. Field of the Invention

This invention relates to fire retardant siloxane foams.

2. Description of the Prior Art

Siloxane foams are known to the art, however, these foams have not had an acceptance in commerce as has other types of foams, such as polyurethane foams. Such a siloxane foam is described by Leonard B. Bruner in U.S. Pat. No. 3,070,555 in which he describes mixing a hydroxylated organopolysiloxane containing silicon-bonded hydrogen, a hydroxylated compound and a stannous salt of a hydrocarbon-soluble carboxylic acid and thereafter allowing the mixture to foam to an elastic product. Another siloxane foam is described by Siegfried Nitzsche et al. in U.S. Pat. No. 3,338,847 in which a foam is prepared from a mixture of a linear hydroxyl endblocked diorganosiloxane polymer, an organohydrogensilicon compound, an aliphatically unsaturated organohydroxy silicon compound and a metal salt of a monocarboxylic acid. Another foam is described by Harold R. Hersh in U.S. Pat. No. 3,429,838 in which a siloxane foam is prepared by mixing a silicone rubber containing a linear, fluid methylpolysiloxane having terminal silicon-bonded hydroxyl groups, diatomaceous earth, zinc oxide, calcined clay, polyethylsilicate and tin octoate with a silicone blowing agent which was a trimethylsilyl chain-stopped dimethylpolysiloxane fluid with some of the silicon-bonded methyl groups replaced by silicon-bonded hydrogen atoms and stannous octoate catalyst.

Also known to the art are fire resistant and self-extinguishing siloxane foams. Ronald L. Joyce in U.S. Pat. No. 2,956,032 describes a fire resistant organosiloxane elastomer foam of the type described by the Bruner patent containing in addition a compound of nickelous bromide, aromatic pentabromoethylbenzene or aromatic pentabromotoluene. Siegfried Nitzsche et al. teach in U.S. Pat. No. 3,428,580 a self-extinguishing organopolysiloxane resin foam containing a resin organosiloxane polymer having alkoxy and hydroxy functionality, a fluid organohydrogen siloxane polymer, a compound having non-acidic reactive hydroxyl groups and a catalyst of quaternary ammonium compounds and carboxylic acid salts of heavy metals.

Although foams can be prepared as described above, there is a problem in use over broad temperature ranges such as from room temperature up to 300° C. and when fire retardant foams are made they often give off toxic vapor ingredients when heated. Thus, a more useful elastomeric siloxane foam is desirable and one which is also non-toxic, particularly when it is fire retardant. It is known that platinum provides fire retardant properties to gum based silicone rubbers as described in U.S. Pat. No. 3,514,424 and from U.S. Pat. No. 3,652,488 that certain silicone rubbers can be made fire retardant by using a combination of platinum and carbon black. From U.S. Pat. No. 3,734,881, it is known that certain room temperature silicone elastomers, namely those containing acetoxy and ketoxime functionality, can be made self-extinguishing and non-toxic by using platinum and carbon black.

From the above prior art, siloxane foams have been prepared and fire retardant siloxane foams have been prepared, however, it was not known prior to application Ser. No. 519,380, filed Oct. 30, 1974, now U.S. Pat. No. 3,923,705 by Schuyler B. Smith and assigned to the same assignee as this application that siloxane foams could be prepared using a platinum catalyst nor was it known that such foams would be both fire retardant and non-toxic and that increased fire retardancy would be obtained by using carbon black. Smith unexpectedly found that a fire retardant foam could be obtained by using a platinum catalyst even though foams ordinarily act as very thin section materials compared to the usual solid material and it is known that the same material in thinner section will burn more rapidly than a thicker section, thus foams are generally more combustible than solid materials and it is therefore unexpected that a siloxane foam would be made fire retardant without the conventional fire retardant additives.

The foams of Smith were found to be essentially closed-cell in structure to the extent of 80 percent or more. It was totally unexpected that open-cell structure could be increased by having present in the foam mixture an organomonohydrogensiloxane.

SUMMARY OF THE INVENTION

It is an object of this invention to provide a method for making an open-cell siloxane foam using platinum catalysts and a fire retardant siloxane foam which is non-toxic.

This invention relates to a method of making an organosiloxane foam by mixing an organohydrogensiloxane, an organomonohydrogensiloxane, a hydroxylated organosiloxane and a platinum catalyst and thereafter allowing a foam to form. These foams are particularly useful for applications of cushioning and sealing where fire retardancy is of importance.

DESCRIPTION OF THE INVENTION

This invention relates to an improvement in a method of preparing an organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoroproply, a hydroxylated organosiloxane having an average of from greater than 1.0 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl and a platinum catalyst in an amount of from 1 to 200 parts by weight platinum per one million parts by weight total composition, said organohydrogensiloxane and said hydroxylated organosiloxane being present in sufficient amounts to provide a molar ratio of silicon-bonded hydrogen atoms to silicon-bonded hydroxyl radicals of 2.5 to 7, where a mixture is obtained having a viscosity of less than 100,000 cps. at 25° C., thereafter allowing a foam to form, the improvement consisting essentially of having present in said mixture an organomonohydrogensiloxane having one silicon-bonded hydrogen atom per molecule and organic radicals selected from the group consisting of alkyl radicals having from one to six carbon atoms per radical, phenyl and 3,3,3-trifluoropropyl, said organomonohydrogensiloxane being present in an amount sufficient enough to provide a molar ratio of silicon-bonded hydrogen atoms from the organohydrogensiloxane to silicon-bonded hydrogen atoms from the organomonohydrogensiloxane of from 0.4 to 2 and the molar ratio of total silicon-bonded hydrogen atoms present in the mixture to silicon-bonded hydroxyl radicals remaining within the limits of 2.5 to 7.

The method of this invention is to mix the ingredients and obtain a foam at room temperature. These ingredients can be mixed in any manner. Thus, the organohydrogensiloxane and the organomonohydrogensiloxane can be mixed with the platinum catalyst and then mixed with the hydroxylated organosiloxane or the platinum catalyst can be mixed with the hydroxylated organosiloxane and then mixed with the organohydrogensiloxane and the organomonohydrogensiloxane. Other methods of mixing are also suitable such as the hydroxylated organosiloxane can be divided into two proportions where one proportion is mixed with the platinum catalyst and the other proportion is mixed with the organohydrogensiloxane and the organomonohydrogensiloxane and then the two mixtures are combined to form a foam. Additionally, the various optional ingredients can be mixed with one or more of the four required ingredients in any manner as long as a premature reaction does not take place before all four ingredients are present in the mixture. For purposes of storage, the organohydrogensiloxane and/or the organomonohydrogensiloxane and the platinum catalyst should not be stored as a mixture because premature gasing can occur.

To control the foaming and curing reactions which are taking place simultaneously, a platinum catalyst inhibitor, such as polymethylvinylsiloxane cyclic compounds and acetylenic alcohols can be added. The platinum catalyst inhibitors are known in the art and many varieties are available. These inhibitors should however not interfere with the foaming and curing in such a manner that destroys the foam product of this invention. The mixture of ingredients should be placed in the desired place where they are to be used as soon as they are mixed because foaming begins immediately, unless a platinum catalyst inhibitor is used to extend the pot life such that they can be mixed and then put in the desired place of use. The amounts of inhibitors are present in relatively small amounts, such as up to 2 parts by weight polymethylvinylsiloxane cyclics can be used to control the initiation of the foaming and curing. The polymethylvinylsiloxane cyclics are known in the art and can be prepared by hydrolyzing methylvinyldichlorosilane, for example.

This method can also be extended to include adding the mixture of organohydrogensiloxane, organomonohydrogensiloxane, hydroxylated organosiloxane and platinum catalyst to other room temperature vulcanizing silicone elastomer compositions, such as those which contain a vinyl organopolysiloxane, an organohydrogensiloxane and a platinum catalyst wherein a useful foam is also obtained. The room temperature vulcanizing silicone elastomer can be mixed with the organohydrogensiloxane, or the organomonohydrogensiloxane, or the platinum catalyst, or it can be mixed with both the organohydrogensiloxane, the organomonohydrogensiloxane and the platinum catalyst and then the hydroxylated organosiloxane can be added to the mixture. A convenient and preferred method is to add a mixture of the organomonohydrogensiloxane and the organohydrogensiloxane last.

The organohydrogensiloxane can be any siloxane having an average of at least three silicon-bonded hydrogen atoms per molecule and an average of no more than one silicon-bonded hydrogen atom per silicon atom. The remaining valences of the silicon atoms are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

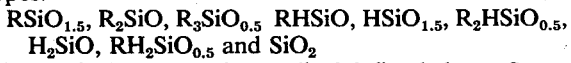

where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes have an average of at least five silicon-bonded hydrogen atoms per molecule.

The organomonohydrogensiloxane can be any siloxane having one silicon-bonded hydrogen atom per molecule. It is understood that the preparations of such compounds, particularly the polymeric species often contain by-produced species in the resulting mixtures which may have more than one silicon-bonded hydrogen per molecule, such mixtures which are, for the most part, made up of molecules with one silicon-bonded hydrogen atom are within the scope of the organomonohydrogensiloxane. These organomonohydrogensiloxanes can contain any of the siloxane units defined above for the organohydrogensiloxane, except for those units having two silicon-bonded hydrogen atoms. A specific example is a trimer of two trimethylsiloxy units and one methylhydrogensiloxane unit.

The hydroxylated organosiloxanes can be any organosiloxane mixture of organosiloxanes having an average of from greater than 1.0 to 2.5 silicon-bonded hydroxyl radicals per molecule. The organic radicals can be any of those monovalent radicals described above for the organohydrogensiloxane. The hydroxylated organosiloxanes can be homopolymers, copolymers or mixtures thereof. They can be mixtures of different molecular weight species and varying hydroxyl contents as long as the average falls within the defined range. The hydroxylated organosiloxane contains an average of at least one organic radical per silicon atom. Examples of the hydroxylated organosiloxane include hydroxyl endblocked polydimethylsiloxane, hydroxyl endblocked polydiorganosiloxane having siloxane units of dimethylsiloxane and phenylmethylsiloxane, hydroxyl endblocked polymethyl-3,3,3-trifluoropropylsiloxane and hydroxyl endblocked polyorganosiloxane having siloxane units of monomethylsiloxane, dimethylsiloxane, monophenylsiloxane and diphenylsiloxane. The hydroxylated organosiloxanes of this invention also includes mixtures of hydroxylated organosiloxane polymers and hydroxylated organosilanes, such as a mixture of hydroxyl endblocked polydimethylsiloxane and diphenylmethylsilanol. As long as some hydroxylated organosiloxane polymer having two or more hydroxyl radicals per molecule is present, hydroxylated silanes can be used to provide from greater than 1.0 to 2.5 silicon-bonded hydroxyl radicals per molecule.

Platinum catalyst can be any of the known forms, ranging from platinum as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture. Another preferred platinum catalyst is a chloroplatinic acid catalyst complex as prepared by the method described in U.S. Pat. No. 3,419,593 which is hereby incorporated by reference, where chloroplatinic acid hexahydrate is mixed with symetrical divinyltetramethyldisiloxane to provide the complex. Another similar complex is one prepared from the chloroplatinic acid hexahydrate, symetrical divinyltetramethyldisiloxane, symetrical tetramethyldisiloxane and alcohol solvent. Additional platinum compounds which include, $$PtCl_2\{P(CH_2CH_2CH_3)_3\}_2,$$

platinum bromides, a complex of platinous halide and an olefin such as ethylene, propylene, butylene, cyclohexene and styrene, $$Pt(CH_3CN)_2Cl_2, \{Pt(CH_2CN)_2(CH_3)_4\}Cl_2,$$

$$PT(NH_3)_2Cl_2, K\{PtCl_3CH_2CH_2CH_2OH\},$$

$$PtBr_2(C_2H_4)_2, \{K\ PtBr_3(C_2H_4)\},$$

$$PtCl_2(C_2H_4), (CH_3)_2C=CH_2 \cdot PtCl_2,$$

$$H_2Pt(CN)_4 \cdot 5H_2O, H\{PtCl_3(CH_2CN)\},$$

$$Pt(NH_3)_2(CNS)_2, PtCl_2 \cdot PCl_3, \{Pt(NH_3)_4\} \cdot \{PtCl_4\},$$

$$PtCl_2\{P(CH_2CH_3)_3\}_2, PtCl_2 \cdot P(OH)_3,$$

$$PtCl_2 \cdot P(OCH_2CH_3)_3, PtCl_2 \cdot \{P(OCH_2CH_3)_3\}_2,$$

$$Pt(OOCH_2SCH_2CH_3)_2, Pt(CN)_3, (CH_3)_4Pt,$$

$$(CH_3)_3Pt(CH_2\overset{-O}{\underset{|}{C}}CH=CCH_3)$$

$PtCl_2CO$ and $PtBr_2CO$.

The platinum catalyst can be present in amounts sufficient to provide from 1 to 200 parts by weight platinum per one million parts by weight total composition (p.p.m.). Preferably, the platinum catalyst is present in amounts to provide from 10 to 50 p.p.m. platinum. Amounts of platinum catalyst which provide less than 1 p.p.m. platinum are insufficient to cause a foam to form and amounts in excess of 200 p.p.m. platinum are uneconomical. For this invention the higher amounts of platinum catalyst should be used with a platinum catalyst inhibitor because the rate of foaming and curing increases with increasing platinum concentration and if the rate becomes too fast, mixing the ingredients is a problem. The amount of platinum should also be sufficient to provide fire retardant properties, either alone or in combination with carbon black.

The organohydrogensiloxane, the organomonohydrogensiloxane and hydroxylated organosiloxane are combined in amounts sufficient enough to provide a ratio of silicon-bonded hydrogen atoms to silicon-bonded hydroxyl radicals of from 2.5 to 7, preferably from 4 to 7. Ratios of less than 2.5 provide foams, but these foams are too friable and weak to be useful in the known applications. The same problem exists at the upper limit. Within the range of the molar ratio of silicon-bonded hydrogen to silicon-bonded hydroxyl, the foam density will decrease as the ratio increases where other factors are constant.

The amount of organomonohydrogensiloxane present in the mixtures of this invention should be sufficient enough to provide a molar ratio of silicon-bonded hydrogen atoms from the organohydrogensiloxane to silicon-bonded hydrogen atoms from the organomonohydrogensiloxane of 0.4 to 2. This molar ratio can be varied to give different amounts of open-cell structure. Thus, using the invention one can predetermine, within limits, the amount of open-cell structure for his specific purpose. The amount of organomonohydrogensiloxane should also not take the molar ratio of silicon-bonded hydrogen atoms present in the total mixture to silicon-bonded hydroxyl radicals outside the limits defined for the compositions described herein.

The molecular weight of any particular ingredient is not significant except that it is compatible or dispersible in the total combination and that the total combination has a viscosity of less than 100,000 centipoise (cps.) at 25° C., preferably less than 25,000 cps. at 25° C. Above 100,000 cps., the mixing of the ingredients becomes a problem. The kind of mixing also influences the foam characteristics, such as void size and density. Thorough mechanical mixing is desirable. Because there are so many variables of mixing speeds, equipment types, shearing conditions and the like, it is not practical to define meaningful conditions. Additionally, any set of conditions would vary as to suitability if the nature and amounts of ingredients were changed.

Other ingredients can be present and include, platinum catalyst inhibitors, such as polymethylvinylsiloxane cyclics and acetylenic inhibitors, for example 3-methyl-1-butyn-3-ol and others as described in U.S. Pat. No. 3,445,420 which is hereby incorporated by reference to show acetylenic compounds and are used to extend the pot life before foaming occurs.

Benzene-soluble vinyl containing triorganosiloxy endblocked polydiorganosiloxanes having an average of about two vinyl radicals per molecule can also be added in amounts up to 85 weight percent based on the combined weight of the vinyl containing triorganosiloxy endblocked polydiorganosiloxane and the hydroxylated organosiloxane. These vinyl containing polydiorganosiloxanes can be mixtures or single specie types and can have organic radicals as defined for the organohydrogensiloxane above plus vinyl. Examples of these types of polymer are widely shown in the prior art such as in U.S. Pat. No. 3,445,420 and U.S. Pat. No. 3,453,234 both which are hereby incorporated by reference to show vinyl containing triorganosiloxy endblocked polydiorganosiloxanes. The vinyl containing triorganosiloxy endblocked polydiorganosiloxanes are preferably present in amounts of 50 weight percent or less, based on the combined weight of the vinyl containing triorganosiloxy endblocked polydiorganosiloxane and the hydroxylated organosiloxane. Although useful foams can be prepared using between 50 and 85 weight percent vinyl containing siloxane, better foams are obtained with mixtures having less than 50 weight percent vinyl containing siloxanes.

The addition of the benzene-soluble vinyl containing triorganosiloxy endblocked polydiorganosiloxanes, whether added as such or added as part of a room temperature vulcanizing silicone elastomer composition can be used to increase the strength of the foam product. When these vinyl siloxanes are present in the mixture, the molar ratio of silicon-bonded hydrogen to silicon-bonded hydroxyl can be varied over a range of from 0.5 to 7. It is not fully understood why this ratio can be varied more broadly with these ingredients, however, the reactions are apparently complex in such mixtures and have not been fully studied to reveal their secrets.

Fillers can also be added to the present mixtures which are used in the method of making foams, such as fume silica, diatomaceous earth, zinc oxide, calcium carbonate, crushed quartz, and the like. The maximum amounts of fillers used will be dependent upon the final viscosity of the composition. Heat stability additives, such as iron oxide can be used in these foams.

The foams of the present invention have more open-cell structure than those foams without the organomonohydrogensiloxane, have fire retardant properties, as prepared, but for many applications it is desirable to increase this property to give added protection and broaden its areas of use. The fire retardant properties of the foams can be increased without adding ingredients which can give off toxic vapors when burned or in contact with fire. By adding, to the ingredients to be mixed to make a foam, from 0.01 to 2 parts by weight carbon black based on the total weight of the composition, preferably from 0.05 to 1 parts by weight, the fire retardant property of the foam is increased. When the carbon black is used the foams are self-extinguishing in short times and do not give off toxic fumes nor do they contain toxic ingredients.

The method of this invention provides a fire retardant siloxane foam which is obtained at room temperature. The ingredients are mixed and then the resulting mixture foams and cures at the same time. The use of the inhibitors permits a level of control of the pot life or working time before foaming begins. The amount of platinum also permits some control of the pot life. The control of pot life is important to allow one to mix the ingredients in a container other than the place where the foam is to be used. Under some circumstances, the mixture does not immediately foam because the combination has a long pot life, as in cases where there is inhibitors present and where the molar ratio of silicon-bonded hydrogen atoms to silicon-bonded hydroxyl radicals is low and a benzene-soluble vinyl containing triorganosiloxy endblocked polydiorganosiloxane is present. Where one wishes to hasten the foam or foam on demand, mild heating will accelerate the foaming process.

The foams prepared as described herein are fire retardant and self-extinguishing and are useful for pads, cushions, pillows, ablative pads, fire retardant cushioning of electronic components, fire retardant walls, fire retardant seals, non-burning uses in areas where persons are confined such as buses, trains, airplanes, and the like.

These foams can be varied in density from 0.10 to 0.30 grams per cubic centimeter. These densities can be changed by varying the ratio of silicon-bonded hydrogen to silicon-bonded hydroxyl as well as the filler loadings. The above densities are suggested for conventional types of fillers, however, it may be possible to obtain densities outside this range by using certain non-conventional or exotic fillers.

The following example is presented for illustrative purposes only and should not be construed as limiting the present invention which is properly delineated in the claims.

EXAMPLE

A series of siloxane foams were prepared by mixing 90 parts by weight of a hydroxyl endblocked polydimethylsiloxane having a viscosity of about 2200 cps. at 25° C., 22.5 parts by weight of a diatomaceous earth, 10 parts by weight of a hydroxyl endblocked polydimethylsiloxane having about 4 weight percent silicon bonded hydroxyl radicals and 13 parts by weight platinum per one million parts by weight composition where the platinum was added in the form of a chloroplatinic acid catalyst complex with symetrical divinyltetramethyldisiloxane containing about 0.65 weight percent platinum which forms a base mixture. To portions of the base mixture, varying mixtures of a trimethylsiloxy endblocked polymethylhydrogensiloxane having about 1.5 weight percent silicon-bonded hydrogen atoms and a compound of the formula

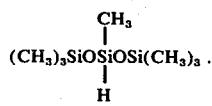

The amount of each SiH component in the SiH mixture and the amount of total SiH mixture mixed with the base mixture were sufficient to give the ratios described in the Table. In the Table, $R_1$ represents the mole ratio of total silicon-bonded hydrogen atoms in the final foam mixture to silicon-bonded hydroxyl radicals in the final foam mixture and $R_2$ represents the mole ratio of silicon-bonded hydrogen atoms from the trimethylsiloxy endblocked polymethylhydrogensiloxane to silicon-bonded hydrogen atoms from the compound described by the formula shown above. For purposes of illustration, where $R_1$ was 4 and $R_2$ was 1.25, a mixture of 4.6 parts by weight of the trimethylsiloxy endblocked polymethylhydrogensiloxane and 13.1 parts by weight of the compound described by the formula shown above was mixed with an amount of the base mixture which provided 100 parts by weight of the combined hydroxyl endblocked polydimethylsiloxane. All the mixtures defined by the Table expanded in about 1.5 minutes and were cured in about three minutes to elastomeric foam having the amount of open-cell structure as defined in the Table by percent, were uniform in cell size, flame resistant, having densities varying from 0.18 to 0.22 grams per cubic centimeter. Mixtures where $R_1$ was less than 2.5 and greater than 7 did not result in useful foams and mixtures where $R_2$ was less than 0.4 did not result in useful foams.

TABLE

| $R_1$ | $R_2$ | % Open-Cell |
|---|---|---|
| 3 | 0.5 | Too Soft |
| 3 | 0.75 | 39 |
| 3 | 1.0 | 63 |
| 3 | 1.5 | 41 |
| 3 | 1.75 | 38 |
| 4 | 0.5 | Too Soft |
| 4 | 0.75 | 26 |
| 4 | 1.0 | 58 |
| 4 | 1.25 | 61 |
| 4 | 1.5 | 42 |
| 4 | 1.75 | 31 |
| 5 | 0.5 | 30 |
| 5 | 0.75 | 28 |
| 5 | 1.0 | 50 |
| 5 | 1.25 | 54 |
| 5 | 1.5 | 39 |
| 5 | 1.75 | 23 |
| 6 | 1.25 | 53 |
| 6 | 1.5 | 39 |
| 6 | 1.75 | 18 |

That which is claimed is:

1. In a method of preparing an organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropyl, a hydroxylated organosiloxane having an average of from greater than 1.0 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl and a platinum catalyst in an amount of from 1 to 200 parts by weight platinum per one million parts by weight total composition, said organohydrogensiloxane and said hydroxylated organosiloxane being present in sufficient amounts to provide a molar ratio of silicon-bonded hydrogen atoms to silicon-bonded hydroxyl radicals of 2.5 to 7, where a mixture is obtained having a viscosity of less than 100,000 cps. at 25° C., thereafter allowing a foam to form, the improvement consisting essentially of having present in said mixture an organomonohydrogensiloxane having one silicon-bonded hydrogen atom per molecule and organic radicals selected from the group consisting of alkyl radicals having from one to six carbon atoms per radical, phenyl and 3,3,3-trifluoropropyl, said organomonohydrogensiloxane being present in an amount sufficient enough to provide a molar ratio of silicon-bonded hydrogen atoms from the organohydrogensiloxane to silicon-bonded hydrogen atoms from the organomonohydrogensiloxane of from 0.4 to 2 and the molar ratio of total silicon-bonded hydrogen atoms present in the mixture to silicon-bonded hydroxyl radicals remaining within the limits of 2.5 to 7.

2. The method in accordance with claim 1 in which the organomonohydrogensiloxane is a trimethylsiloxy endblocked methylhydrogensiloxane having one methylhydrogensiloxane unit per molecule.

3. The method in accordance with claim 1 in which the organohydrogensiloxane is a trimethylsiloxy endblocked polymethylhydrogensiloxane having a viscosity of less than 100 cps. at 25° C. and the hydroxylated organosiloxane is a hydroxyl endblocked polydimethylsiloxane having a viscosity of less than 25,000 cps. at 25° C.

4. The method in accordance with claim 3 in which the hydroxylated organosiloxane is a mixture of a hydroxyl endblocked polydimethylsiloxane having a viscosity of from 1000 to 25,000 cps. at 25° C. and a hydroxyl endblocked polydimethylsiloxane having a viscosity of from 20 to 200 cps. at 25° C.

5. The method in accordance with claim 3 in which polymethylvinylsiloxane cyclics are present in amounts sufficient to retard foaming and curing reactions where such amounts are up to 2 weight percent based on the total weight of the composition.

6. The method in accordance with claim 3 in which an acetylenic alcohol inhibitor is present in an amount sufficient to increase the foaming time sufficiently to allow thorough mixing of the ingredients.

7. The method in accordance with claim 4 in which an acetylenic alcohol inhibitor is present in an amount sufficient to increase the foaming time sufficiently to allow thorough mixing of the ingredients.

8. The method in accordance with claim 1 in which carbon black is present in an amount of from 0.01 to 2 parts by weight based on the weight of the total composition.

9. In a method of preparing an organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropyl, a hydroxylated organosiloxane having an average of from 1.5 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl, a benzene-soluble vinyl containing triorganosiloxy endblocked polydiorganosiloxane having an average of about two vinyl radicals per molecule and present in an amount equal to no more than 85 weight percent of the combined weight of the hydroxylated organosiloxane and the benzene-soluble vinyl containing triorganosiloxy endblocked polydiorganosiloxane, the organic radicals of the benzene-soluble vinyl containing triorganosiloxy endblocked polydiorganosiloxane being selected from the group consisting of alkyl radicals having from one to six carbon atoms per radical, phenyl, vinyl and 3,3,3-trifluoropropyl and a platinum catalyst in an amount of from 1 to 200 parts by weight platinum per one million parts by weight total composition, said organohydrogensiloxane and said hydroxylated organosiloxane being present in sufficient amounts to provide a molar ratio of silicon-bonded hydrogen atoms to silicon-bonded hydroxyl radicals of 0.5 to 7, where a mixture is obtained having a viscosity of less than 100,000 cps. at 25° C., thereafter allowing a foam to form, the improvement consisting essentially of having present in said mixture an organomonohydrogensiloxane having one silicon-bonded hydrogen atom per molecule and organic radicals selected from the group consisting of alkyl radicals having from one to six carbon atoms per radical, phenyl and 3,3,3-trifluoropropyl, said organomonohydrogensiloxane being present in an amount sufficient enough to provide a molar ratio of silicon-bonded hydrogen atoms from the organohydrogensiloxane to silicon-bonded hydrogen atoms from the organomonohydrogensiloxane of from 0.4 to 2 and the molar ratio of total silicon-bonded hydrogen atoms present in the mixture to silicon-bonded hydroxyl radicals remaining within the limits of 0.5 to 7.

10. The method in accordance with claim 9 in which an acetylenic alcohol inhibitor is present in an amount sufficient to increase the foaming time sufficiently to allow thorough mixing of the ingredients.

11. The method in accordance with claim 9 in which polymethylvinylsiloxane cyclics are present in amounts sufficient to retard foaming and curing reactions where such amounts are up to 2 weight percent based on the total weight of the composition.

12. The method in accordance with claim 9 in which carbon black is present in an amount of from 0.01 to 2 parts by weight based on the weight of the total composition.

13. The method in accordance with claim 9 in which the organohydrogensiloxane is a trimethylsiloxy endblocked polymethylhydrogensiloxane having a viscosity of less than 100 cps. at 25° C. and the hydroxylated organosiloxane is a mixture of a hydroxyl endblocked polydimethylsiloxane having a viscosity of from 1000 to 25,000 cps. at 25° C. and a hydroxyl endblocked polydimethylsiloxane having a viscosity of from 20 to 200 cps. at 25° C.

14. The method in accordance with claim 13 in which the benzene-soluble vinyl containing triorganosiloxy endblocked polydiorganosiloxane is a phenylmethylvinylsiloxy endblocked polydimethylsiloxane having a viscosity of less than 25,000 cps. at 25° C.

15. The method in accordance with claim 1 in which fillers are present.

16. The method in accordance with claim 4 in which fillers are present.

17. The method in accordance with claim 8 in which fillers are present.

18. The method in accordance with claim 9 in which fillers are present.

19. The method in accordance with claim 13 in which fillers are present.

20. The method in accordance with claim 14 in which fillers are present.

21. An open-cell foam prepared by the method of claim 1.

22. An open-cell foam prepared by the method of claim 4.

23. An open-cell foam prepared by the method of claim 8.

24. An open-cell foam prepared by the method of claim 9.

25. An open-cell foam prepared by the method of claim 11.

26. An open-cell foam prepared by the method of claim 12.

27. An open-cell foam prepared by the method of claim 13.

28. An open-cell foam prepared by the method of claim 14.

29. An open-cell foam prepared by the method of claim 15.

30. An open-cell foam prepared by the method of claim 16.

31. An open-cell foam prepared by the method of claim 17.

32. An open-cell foam prepared by the method of claim 18.

33. An open-cell foam prepared by the method of claim 19.

34. An open-cell foam prepared by the method of claim 20.

35. The method in accordance with claim 9 in which the amount of benzene-soluble vinyl containing triorganosiloxy endblocked polydiorganosiloxane is present in no more than 50 weight percent of the combined weight of the hydroxylated organosiloxane and the benzene-soluble vinyl containing triorganosiloxy endblocked polydiorganosiloxane.

* * * * *

UNITED STATES PATENT AND TRADEMARK OFFICE
CERTIFICATE OF CORRECTION

PATENT NO. : 4,026,842

DATED : May 31, 1977

INVENTOR(S) : Chi-Long Lee and Gary M. Ronk

It is certified that error appears in the above-identified patent and that said Letters Patent are hereby corrected as shown below:

Column 2, line 49, the word "trifluoroproply" should read "trifluoropropyl"

Column 5, line 36 - the formula "PT$(NH_3)_2Cl_2$" should read "Pt$(NH_3)_2Cl_2$"

Column 5, line 38 - the formula "{K Pt$Br_3(C_2H_4)$}" should read "K{Pt$Br_3(C_2H_4)$}"

Column 5, line 52 - the formula "$(CH_3)_3$Pt-Pt$(CH_3)_3$" should be inserted after the formula "$(CH_3)_4$Pt"

Signed and Sealed this

Fifth Day of January 198

[SEAL]

Attest:

GERALD J. MOSSINGHOFF

*Attesting Officer*    *Commissioner of Patents and Trademarks*